United States Patent
Nguyen et al.

(10) Patent No.: US 9,530,062 B2
(45) Date of Patent: Dec. 27, 2016

(54) FUSED RAISED PAVEMENT MARKER DETECTION FOR AUTONOMOUS DRIVING USING LIDAR AND CAMERA

(71) Applicant: VOLKSWAGEN AG, Wolfsburg (DE)

(72) Inventors: Tuan Tran Nguyen, Magdeburg (DE); Daniel Lipinski, Belmont, CA (US); Jens Spehr, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 23 days.

(21) Appl. No.: 14/580,287

(22) Filed: Dec. 23, 2014

(65) Prior Publication Data
US 2016/0180177 A1    Jun. 23, 2016

(51) Int. Cl.
| | | |
|---|---|---|
| *G06K 9/00* | (2006.01) |
| *G06K 9/52* | (2006.01) |
| *G06K 9/46* | (2006.01) |
| *G06T 7/00* | (2006.01) |
| *G06T 7/20* | (2006.01) |

(52) U.S. Cl.
CPC ......... *G06K 9/00798* (2013.01); *G06K 9/4661* (2013.01); *G06K 9/52* (2013.01); *G06T 7/0083* (2013.01); *G06T 7/0087* (2013.01); *G06T 7/208* (2013.01); *G06T 7/2033* (2013.01); *G06T 2207/10016* (2013.01); *G06T 2207/20076* (2013.01); *G06T 2207/30256* (2013.01)

(58) Field of Classification Search
None
See application file for complete search history.

(56) References Cited

U.S. PATENT DOCUMENTS

| | | | |
|---|---|---|---|
| 5,293,162 A | 3/1994 | Bachalo | |
| 8,755,967 B1 | 6/2014 | Ferguson et al. | |
| 9,063,548 B1 * | 6/2015 | Ferguson | G05D 1/0231 |
| 9,081,385 B1 * | 7/2015 | Ferguson | G06K 9/00798 |
| 9,162,622 B2 * | 10/2015 | Szczerba | G01S 13/723 |
| 2010/0253594 A1 * | 10/2010 | Szczerba | G01S 13/723 345/7 |
| 2014/0156178 A1 | 6/2014 | Yoo | |

(Continued)

OTHER PUBLICATIONS

Aly; Real time Detection of Lane Markers in Urban Streets; Intelligent Vehicles Symposium 2008 IEEE; Jun. 4-6, 2008; pp. 7-12.

(Continued)

*Primary Examiner* — Nancy Bitar
(74) *Attorney, Agent, or Firm* — Barnes & Thornburg LLP

(57) ABSTRACT

An in-vehicle system for estimating a lane boundary based on raised pavement markers that mark the boundary. The in-vehicle system includes a camera for obtaining image data regarding reflective raised pavement markers and non-reflective raised pavement markers, an image processor for processing frames of image data captured by the camera, a lidar detector for obtaining lidar data regarding reflective raised pavement markers, and a lidar processor for processing frames of lidar data captured by the lidar detector. The image processor generates a first probabilistic model for the lane boundary and the lidar processor generates a second probabilistic model for the lane boundary. The in-vehicle system fuses the first probabilistic model and the second probabilistic model to generate a fused probabilistic model and estimates the lane boundary based on the fused probabilistic model.

16 Claims, 9 Drawing Sheets

(56) References Cited

U.S. PATENT DOCUMENTS

2014/0195138 A1* 7/2014 Stelzig .................. G08G 1/0116
　　　　　　　　　　　　　　　　　　　　　701/119

OTHER PUBLICATIONS

Atev et al.; Clustering of Vehicle Trajectories; IEEE Transactions on Intelligent Transportation Systems; Sep. 2010; pp. 647-657; vol. 11, No. 3.
Gehrig et al.; Lane Recognition on Poorly Structured Roads—the Bots Dot Problem in California; IEEE Conference on Intelligent Transportation Systems; 2002; pp. 101-105.
Hillel et al.; Recent progress in road and lane detection: a survey; Machine Vision and Applications; Feb. 7, 2012; Springer.
Ihler et al.; Efficient Multiscale Sampling from Products of Gaussian Mixtures; Neural Information Processing Systems; 2003.
McCall et al.; An Integrated, Robust Approach to Lane Marking Detection and Lane Tracking; 2004 IEEE Intelligent Vehicles Symposium; Jun. 14-17, 2004; pp. 533-537; Parma, Italy.
Spehr; On Hierarchical Models for Visual Recognition and Learning of Objects, Scenes, and Activities; Jun. 7, 1980; pp. 58-59 and 105-106.
Töpfer et al.; Efficient Scene Understanding for Intelligent Vehicles Using a Part-Based Road Representation; Proceedings of the 16th International IEEE Annual Conference on Intelligent Transportation Systems; 2013.

* cited by examiner

FUSED RAISED PAVEMENT MARKER DETECTION FOR AUTONOMOUS DRIVING USING LIDAR AND CAMERA

BACKGROUND

The present disclosure relates to systems, components, and methodologies for autonomous driving systems of vehicles. In particular, the present disclosure relates to systems, components, and methodologies that improve lane boundary detection of autonomous driving systems.

SUMMARY

According to the present disclosure, systems, components, and methodologies are provided for detecting lane boundaries on a roadway.

In illustrative embodiments, an in-vehicle lane boundary detection system detects and tracks lane boundaries based on raised pavement markers that mark the lane boundaries. The in-vehicle lane boundary detection system includes a camera and an associated image processing module for detecting raised pavement markers, for performing image-based processing on the detected markers, and for formulating an image-based probability model. The in-vehicle lane boundary detection system also includes a lidar detector and an associated lidar processing module for detecting reflective raised pavement markers, for performing lidar-based processing on the detected markers, and for formulating a lidar-based probability model. Means for fusing, such as a fusing module, may fuse the image-based probability model and the lidar-based probability model to formulate a first fused probability model, which is used to arrive at an estimation of the lane boundary. The first fused probability model may be further fused with a probability model derived based on detection and analysis of painted lane markings to formulate a second fused probability model, which is used to arrive at an estimate of both the lane boundary and other roadway features that are marked using painted lane markings.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
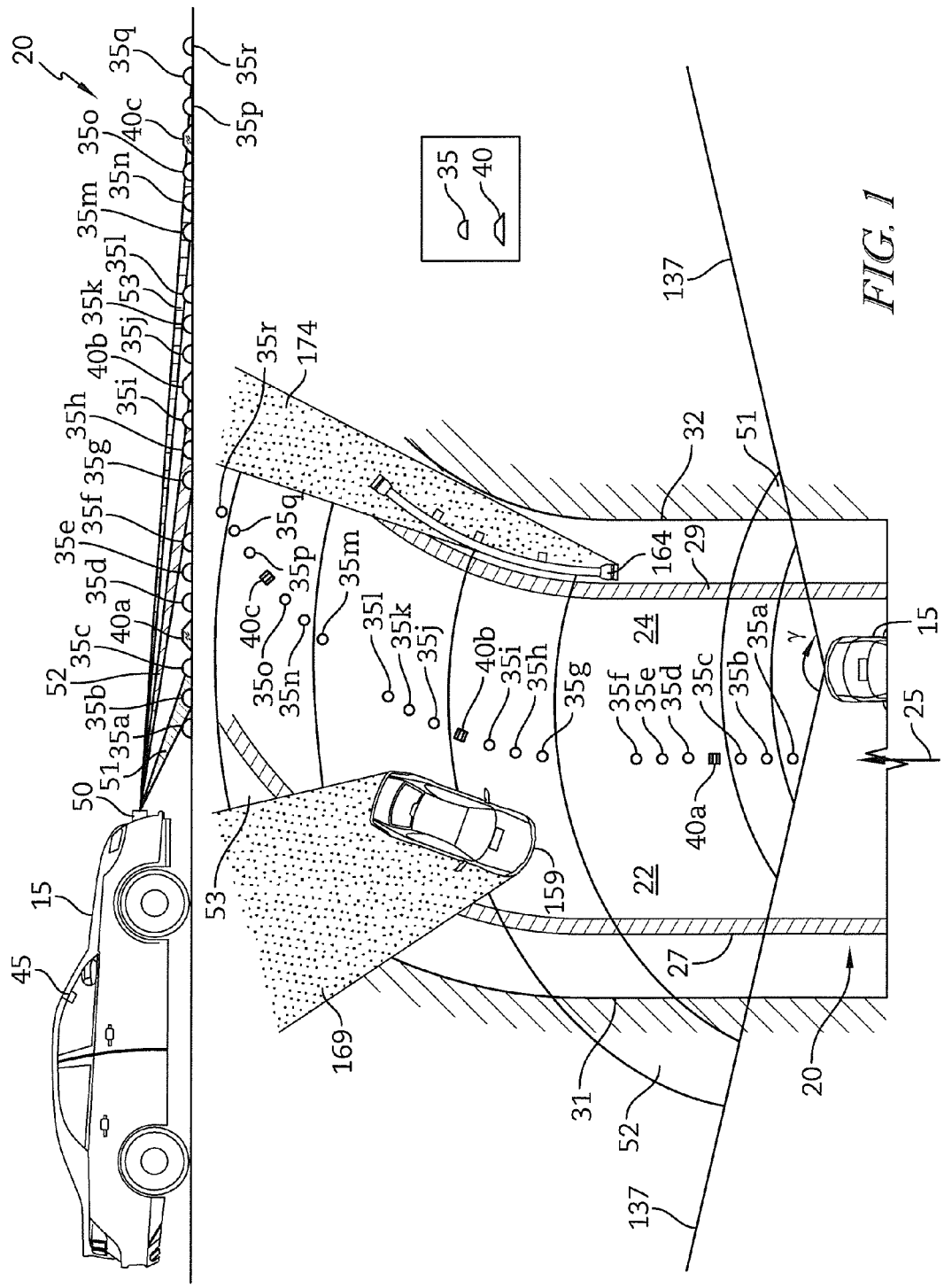
FIG. 1 is a side perspective view and plan perspective view showing a vehicle equipped with a lane boundary detection system in accordance with the present disclosure on a roadway having a lane boundary marked by reflective raised pavement markers and non-reflective raised pavement markers, and suggests that the lane boundary detection system includes a camera capturing image data of the roadway and a lidar detector capturing lidar data of the roadway.
Figure 2:
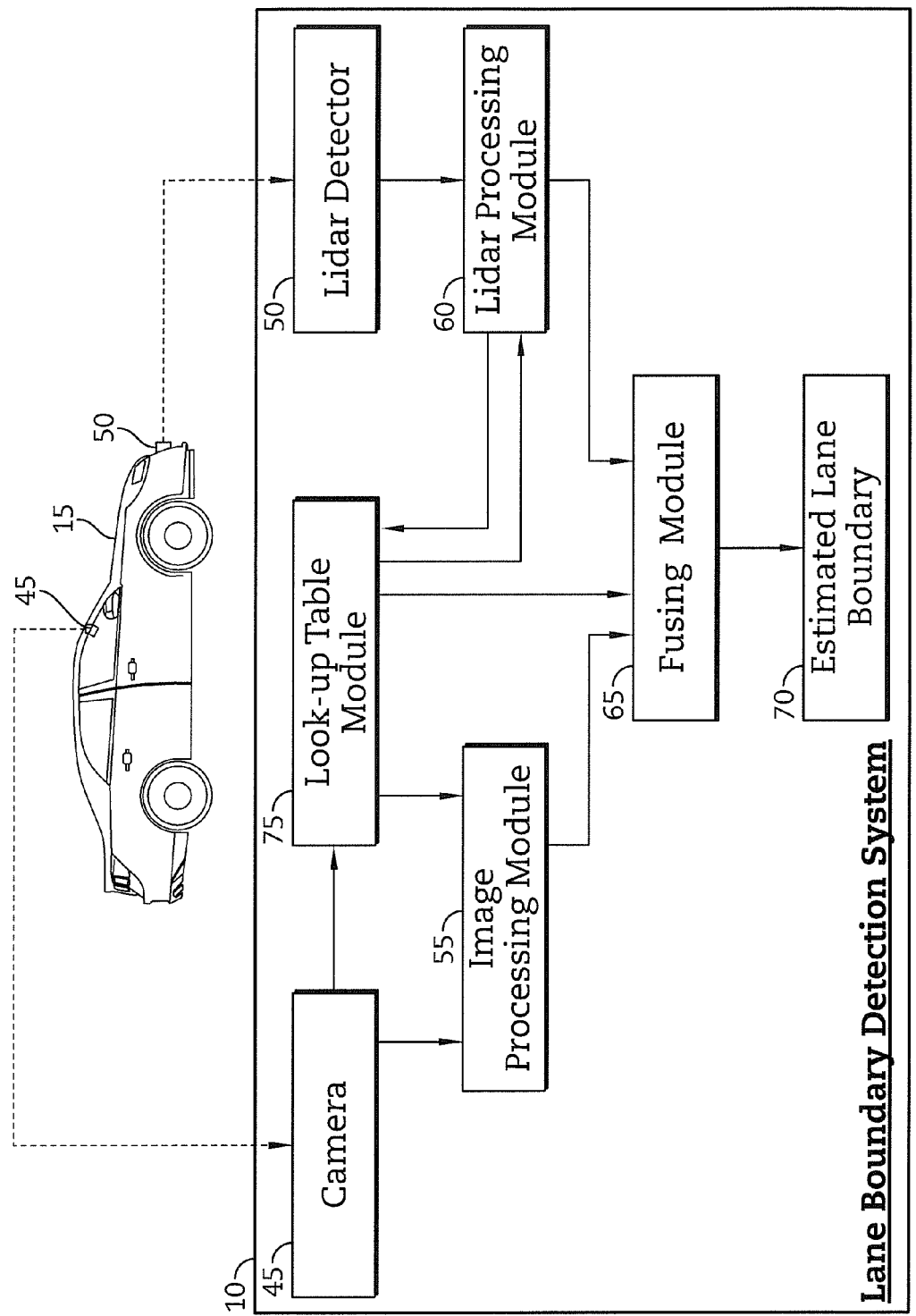
FIG. 2 is a diagrammatic view of a lane boundary detection system in accordance with the present disclosure that includes a camera for capturing frames of image data of a roadway, an image processing module for processing captured image data to arrive at an image-based probability model for the lane boundary, a lidar detector for capturing frames of lidar data of a roadway, a lidar processing module for processing captured lidar data to arrive at a lidar-based probability model for the lane boundary, and a fusing module for fusing the image-based probability model and the lidar-based probability model to generate an estimation of the lane boundary.

FIG. 1 shows a vehicle 15 driving on a roadway 20, and FIG. 2 shows a lane boundary detection system 10 with which vehicle 15 is equipped. Roadway 20 includes lanes 22, 24 separated by a lane boundary 25. Vehicle 15 may include systems that benefit from accurate detection of lane boundary 25. For example, vehicle 15 may include an autonomous driving system (not shown) that steers vehicle 15, and that maintains vehicle 15 within lane 24. Such an autonomous driving system would benefit from accurate detection of lane boundary 25. As another example, vehicle 15 may include a lane departure warning system that issues a notification to a driver when vehicle 15 is departing lane 24. Such a lane departure warning system would also benefit from accurate detection of lane boundary 25.

Lane boundaries may be marked by different types of lane markings, including painted lane markings, non-reflective raised pavement markers, and reflective raised pavement markers. Raised pavement markers are sometimes referred to as "Botts' Dots," and have typically been used on roadways to provide drivers with visual and tactile feedback regarding lane boundaries. Raised pavement markers are widely used, particularly in warmer weather climates, where there is less likelihood that the raised pavement markers will be obstructed by snow or destroyed by snow plows. In fact, in certain warmer weather locales, such as the southwestern United States, roadways may not include any painted lane markings, and may solely use raised pavement markers to mark lane boundaries.

Certain in-vehicle systems may be capable of detecting and tracking lane boundaries using painted lane markings, but may not be technically capable of detecting and tracking lane boundaries using raised pavement markers. Such systems may be technically inoperable on roadway environments having lane boundaries marked solely by raised pavement markers. Lane boundary detection system 10 offers a technical solution to this technical problem by detecting and tracking lane boundaries through detection of raised pavement markers.

FIG. 1 shows that lane boundary 25 is marked by non-reflective raised pavement markers 35 and reflective raised pavement markers 40. In this illustrative example, there are eighteen non-reflective raised pavement markers 35a-r and three reflective raised pavement markers 40a-c. Roadway 20 may also have painted roadway borders 27, 29, which in this illustrative example are marked by painted lane markings. Although painted roadway borders 27, 29 are painted lane markings in this example, the systems, components, and methodologies of the present disclosure may be used on roadways without any painted lane markings. Finally, roadway 20 may also include boundary structures 31, 32 that generally follow the trajectory of roadway 20 along its periphery. Examples of boundary structures 31, 32 may include sidewalks, walls, curbs, rails, or other like structures.

Lane boundary detection system 10 detects and tracks lane boundary 25 by detecting non-reflective raised pavement markers 35 and reflective raised pavement markers 40, forming probabilistic models based on the detected raised pavement markers 35, 40, and estimating the course of lane boundary 25 based on the probabilistic models. Lane boundary detection system 10 forms its estimation based on combined operations of a camera 45 and associated image processing module 55, shown in FIGS. 2 and 3, and a lidar detector 50 and associated lidar processing module 60, shown in FIGS. 2 and 4.

Figure 3:
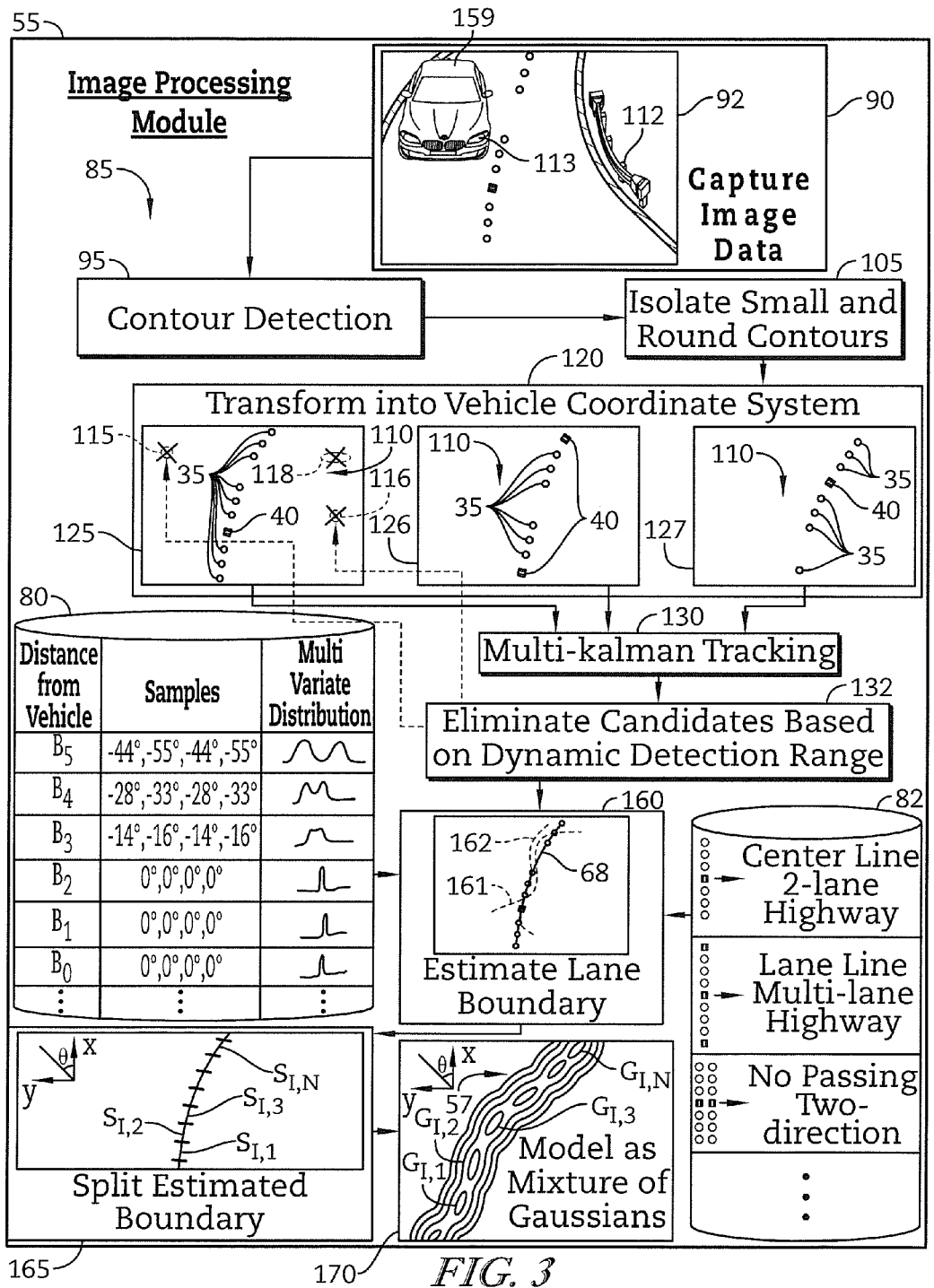
FIG. 3 is a diagrammatic view of an image-based process performed by the image processing module in accordance with the present disclosure showing that the image-based process includes the operations of capturing image data, applying contour detection, isolating contours consistent with raised pavement markers, transforming data into a vehicle coordinate system, tracking candidate raised pavement markers, eliminating false positives among the set of candidate raised pavement markers, estimating a lane boundary, splitting the estimated lane boundary into segments, and modeling the estimated lane boundary as a mixture of Gaussians.

Camera 45 and image processing module 55, shown in FIGS. 2 and 3, detect both non-reflective raised pavement markers 35 and reflective raised pavement markers 40, and form an image-based probabilistic model 57 for lane boundary 25. Lidar detector 50 and lidar processing module 60, shown in FIGS. 2 and 4, capture lidar data, detect reflective raised pavement markers 40, and form a lidar-based probabilistic model 62 for lane boundary 25. Lane boundary detection system 10 may include means for fusing the image-based probabilistic model 57 and the lidar-based probabilistic model 62 and estimating lane boundaries, such as a fusing module 65, shown in FIGS. 2 and 6. Fusing module 65 fuses the image-based probabilistic model 57 and the lidar-based probabilistic model 62 to generate a fused probabilistic model 240, which is used to form an estimation 70 regarding the course of lane boundary 25. Fusing module 65 may also receive a probabilistic model 242 for painted roadway borders 27, 29, and further fuse the probabilistic model 242 with the fused probabilistic model 240 to generate a second fused probabilistic model 243, which is used to form not only an estimation 70 regarding the course of lane boundary 25, but also estimations 71, 72 of painted roadway borders 27, 29 respectively.

The use of a camera 45 and image processing module 55 in combination with a lidar detector 50 and lidar processing module 60 enhances performance of lane boundary detection system 10. Camera 45 and image processing module 55 provide an advantage in that they may be able to detect both non-reflective raised pavement markers 35 and reflective raised pavement markers 40 over a certain range in front of vehicle 15, such as, for example, 25 m or 30 m. Lidar detector 50 may only be able to detect reflective raised pavement markers 40, and may not be able to detect non-reflective raised pavement markers 35.

However, lidar detector 50 and lidar data processing module 60 provide advantages as well. For example, lidar detector 50 may be able to detect reflective raised pavement markers 40 over a much larger range, such as, for example, 100 m or more. Lidar detector 50 may also be more accurate than image-based detection from camera 45. By way of example, lidar detector 50 may be able to detect reflective objects located 100 m away to within 10 cm. Moreover lidar detector 50 is less susceptible to problems associated with lack of environmental light illumination, changing light conditions when exiting or entering tunnels, driving at night, and the like, which are situations in which camera 45 may suffer from degraded performance. In addition, lidar detector 50 and lidar data processing module 60 may be able to provide additional redundancy to detections of reflective raised pavement markers 40 within the range of camera 45, improving accuracy and reducing false positives. Finally, lidar detector 50 may be less likely to be impacted by pitching and rolling motions of vehicle 15 than camera 45. Lane boundary detection system 10 is able to harness the combined benefits of camera 45 and lidar detector 50.

As explained, not all roadways may include painted lane markings, but where they do exist, lane boundary detection system 10 can further improve the accuracy of its detection and tracking of lane boundary 25. Lane boundary detection system 10 may include a look-up table module 75, shown in FIGS. 2 and 5A-B, that creates a look-up table 80 based on detected painted lane markings and/or based on captured lidar data. Look-up table module 75 may create look-up table 80 for each frame of image data and/or lidar data captured by camera 45 and/or lidar detector 50. Image processing module 55 and lidar processing module 60 may consult look-up table 80 to guide the creation of and improve the accuracy of, image-based probabilistic model 57 and lidar-based probabilistic model 62, respectively. As a result, estimation 70 of lane boundary 25 may be more accurate.

FIGS. 2 and 3 show the components and operation of camera 45 and image processing module 55 in more detail. As explained, camera 45 and image processing module 55 detect non-reflective raised pavement markers 35 and reflective raised pavement markers 40 to form an image-based probabilistic model 57 for lane boundary 25. In exemplary implementations, the camera 45 may be of the type available from KOSTAL® Group of Lüdenscheid, Germany. Camera 45 may include a mono camera with resolution sufficient to detect non-reflective raised pavement markers 35 and reflective raised pavement markers 40 at distances of up to about 30 m, though cameras with other resolutions and ranges are within the scope of the present disclosure. Camera 45 is depicted as being mounted on an interior, upper portion of a windshield of vehicle 15, but other locations are within the scope of the present disclosure, including on a front hood, rooftop, front grill, or front bumper of vehicle 15. Camera 45 may be positioned such that the image data it captures includes roadway 20 and any visible non-reflective raised pavement markers 35, reflective raised pavement markers 40, and painted roadway borders 27, 29 that are generally in front of vehicle 15.

Image processing module 55 forms image-based probabilistic model 57 through image-based process 85, as shown in FIG. 3. Image-based process 85 begins with a capturing operation 90, in which camera 45 captures frames of image data 92 of roadway 20. Image processing module 55 may perform image preprocessing steps (not shown) on captured frames of image data 92. Examples of preprocessing steps may include to remove redundant portions of the image (e.g., divide the image in half) to reduce the processing time and the number of false positives, and to apply dilation, erosion and Gaussian blurring operations to eliminate noise in the images.

Image-based process 85 then proceeds to detection operation 95, in which image processing module 55 applies a contour detection algorithm to frames of image data 92. Any contour detection algorithm capable of detecting contours of objects having the relative size and shape of non-reflective raised pavement markers 35 and reflective raised pavement markers 40 may be used. In this illustrative embodiment, detection operation 95 may implement a Canny edge detector and then subsequently detect contours based on outputs of the Canny edge detector.

Image-based process 85 then proceeds to isolating operation 105, in which image processing module 55 identifies candidate raised pavement markers 110 by isolating contours having characteristics consistent with raised pavement markers. Generally, isolating operation 105 will choose light-on-dark regions as candidate raised pavement markers 110. For example, non-reflective raised pavement markers 35 are generally round and small. Thus, isolating operation 105 may isolate contours that are round and small, consistent with the shape and size of non-reflective raised pavement markers 35. In illustrative embodiments, image processing module 55 may be pre-programmed with a size threshold, and may isolate any closed, rounded contours that are smaller than the size threshold. Reflective raised pavement markers 40, on the other hand, may be rectangular and small. Thus, isolating operation 105 may also isolate any closed, rectangular contours within image data that are smaller than the size threshold.

In other implementations, camera 45 may not have sufficient resolution to distinguish round contours from rectangular contours, and may simply search for contours that are sufficiently small in size. In this illustration, light-on-dark region 118 was excluded as being a candidate raised pavement marker 110 because it is not sufficiently small.

As shown in FIG. 3, the result of isolating operation 105 is an identification of candidate raised pavement markers 110, some of which correspond to actual non-reflective raised pavement markers 35, some of which correspond to actual reflective raised pavement markers 40, and others of which are false positives 115, 116. False positives 115, 116 may be isolated by isolating operation 105 but do not actually correspond to a raised pavement marker on roadway 20. False positives 115, 116 may be caused by white spots on roadway 20, lights on roadway 20 (e.g., head or tail lights of other vehicles, street lights, etc.), or other such sources. In this example, false positive 115 arises due to a headlight 113 of vehicle 159, and false positive 116 arises due to a reflective portion 112 of guard rail 164. As explained, false positives may also arise due to other types of objects or features that are visually similar to raised pavement markers 35, 40, or may even represent errors in image data 92.

After isolation operation 105, image-based process 85 proceeds to transforming operation 120, in which the image data being processed is transformed into a vehicle coordinate system (i.e., top-down or "birds eye" perspective), to facilitate subsequent processing. Transforming operation may be based on calibrated camera parameters. In certain implementations, transforming operation 120 may assume that vehicle 15 is moving on a flat ground plane, but in other implementations, transforming operation 120 may itself be able to detect an angle of incline for vehicle 15 and adjust calibrations accordingly.

Exemplary outputs 125, 126, 127 of transforming operation 120 are shown in FIG. 3. Outputs 125, 126, 127 correspond to consecutively captured frames of image data 92, with output 125 corresponding to a first point in time, output 126 corresponding to a second point in time in which vehicle 15 is further advanced along roadway 20, and output 127 corresponding to a third point in time, in which vehicle 15 is still further advanced along roadway 20. As suggested, candidate raised pavement markers 110 advance in their respective locations within image data 92 as vehicle 15 proceeds along roadway 20.

Image-based process 85 then proceeds to tracking operation 130, in which image processing module 55 tracks each of the candidate raised pavement markers 110 over the course of sequential outputs 125, 126, 127. In this illustrative embodiment, tracking operation 130 employs a multi-Kalman filter, but other object detection and tracking methodologies are within the scope of the present disclosure. A vehicle motion model may provide a dynamic model used to predict a previously estimated state. A component of vehicle 15 (not shown) may provide current velocity, yaw rate and acceleration in lateral and longitudinal directions to facilitate tracking operation 130. Tracking operation 130 allows image processing module 55 to more efficiently and accurately track the position of candidate raised pavement markers 110 over the course of sequential frames of image data 92, without needing to re-detect candidate raised pavement markers 110 anew for each frame of image data 92.

Image-based process 85 then proceeds to eliminating operation 132, in which false positives 115, 116 are removed from the set of candidate raised pavement markers 110. False positives 115, 116 may be removed based on analysis of a dynamic detection range of lidar detector 50. In this example, false positive 115 caused by headlight 113 and false positive 116 caused by reflective portion 112 lie outside the dynamic detection range of lidar detector 50, as will be explained below, and as such they are ruled out.

Dynamic detection range of lidar detector 50 generally refers to a region within the detection range of lidar detector 50 that is not obstructed by occluding objects. If one of the candidate raised pavement makers 110 is detected in a location outside the dynamic detection range of lidar detector 50, it is likely a false positive, because actual raised pavement markers 35, 40 would ordinarily not be visible to camera 45 in such locations.

Figure 7:
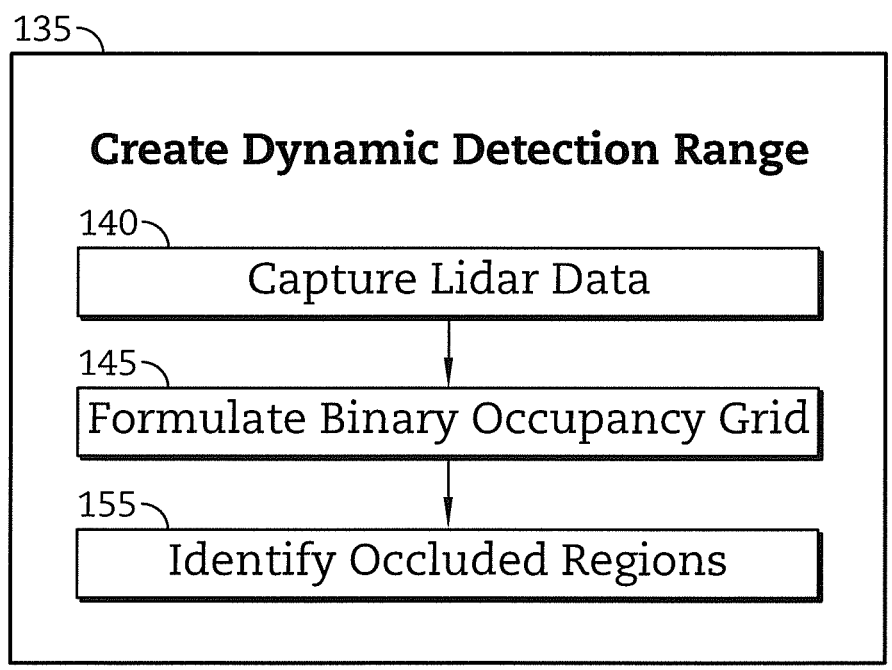
FIG. 7 is a flow diagram of a dynamic detection range creation process in accordance with the present disclosure, showing that creating a dynamic detection range includes the operations of capturing lidar data, formulating a binary occupancy grid, and identifying occluded regions.

FIG. 1 illustrates a dynamic detection range of lidar detector 50, and FIG. 7 shows a dynamic detection range creation process 135. FIG. 1 shows that lidar detector 50 has a detection range that occupies detection cone 137. In this example, lidar detector 50 is a two-dimensional lidar detector, having three separate two-dimensional detection layers 51, 52, 53 that span detection cone 137 and from which lidar data is collected. As generally known for lidar detectors, lidar detector 50 operates by emitting light within detection cone 137 and analyzing characteristics of reflected light, such as time of return or angle of return, to detect the presence and location of objects having reflective properties.

Dynamic detection range creation process 135, shown in FIG. 7, begins with a capturing operation 140, in which lidar detector 50 captures lidar data in layers 51, 52, 53 within detection cone 137. Dynamic detection range creation process 135 proceeds to formulating operation 145, in which lidar processing module 60 formulates a binary occupancy grid within detection cone 137. To formulate a binary occupancy grid, lidar processing module 60 may create a programmatic representation (not shown) of lidar data collected within detection cone 137, overlay a grid (not shown) on the programmatic representation, and determine whether each cell of the grid is known to be occupied, known to be free, or in an unknown state. For example, cells where lidar beams cannot reach may be considered occupied, cells where lidar beams can detect reflective targets may be considered free, and other cells may be considered unknown. Generally, any suitable binary occupancy grid formulation technique may be used. In illustrative embodiments, formulating operation 145 factors historical data collected by lidar detector 50 to formulate a binary occupancy grid, but in other embodiments, formulating operation 145 formulates a binary occupancy grid based solely on a current frame of received lidar data.

Dynamic detection range creation process 135 then proceeds to identifying operation 155, in which lidar processing module 60 identifies occluded regions. Identifying operation 155 may identify occluded regions based on the binary occupancy grid. In the example of FIG. 1, dynamic detection range creation process 135 identified occluded region 169, where lidar beams could not reach due to presence of vehicle 159 and for which cells of the binary occupancy grid would be occupied. Similarly, dynamic detection range creation process 135 identified occluded region 174, where lidar beams could not reach due to presence of guard rail 164. Thus, in the example of FIG. 1, the dynamic detection range includes the area within detection cone 137, excluding occluded regions 169, 174.

Returning to FIG. 3, eliminating operation 132 eliminates false positives 115, 116 among candidate raised pavement markers 110 based on the dynamic detection range of lidar detector 50. In output 125 of FIG. 3, false positive 115 is eliminated from the set of candidate raised pavement markers 110 (indicated by way of an X) because it is in occluded region 169, and false positive 116 is eliminated from the set of candidate raised pavement markings 110 (indicated by way of an X) because it is in occluded region 174.

Image-based process 85 then proceeds to estimating operation 160, in which image processing module 55 foams an estimation 68 of lane boundary 25 based on the remaining candidate raised pavement markers 110. In this illustrative example, estimation 68 of lane boundary 25 is formed from a spline, and any type of spline-fitting approach may be applied to candidate raised pavement markers 110 to form estimation 68. For example, the Random Sample Consensus (RANSAC) algorithm may be applied to identify a spline that provides a best-fit estimation 68 for candidate raised pavement markers 110.

Under such a RANSAC-based implementation, estimating operation 160 may first randomly select a subset of candidate raised pavement markers 110. Estimating operation 160 may then select a candidate spline that fits the selected subset of candidate raised pavement markers 110. Estimating operation 160 may then, optionally, select additional candidate raised pavement markers 110 that are consistent with the candidate spline, and add the additional candidate raised pavement makers 110 to the initially selected subset of candidate raised pavement markers 110 to re-generate the candidate spline.

Estimating operation 160 may then determine a fitting score for the candidate spline that numerically measures how good of a fit a candidate spline is likely to be. The fitting score may be based on how far candidate raised pavement markers 110 are positioned relative to the candidate spline, with candidate raised pavement markers 110 being positioned far from the candidate spline generally lowering the fitting score. The score may also factor the straightness/curvature and length of candidate splines. For example, splines with curvatures that are atypical of lane boundaries may be assigned lower fitting scores. Yet another factor that may impact the fitting score is the distance between neighboring candidate raised pavement markers 110 that fit the spline. If the candidate raised pavement markers that fit the spline assume a pattern that is typical of raised pavement markers on roadway environments (e.g., similar distances between candidate raised pavement markers 110), the spline may be assigned a higher fitting score.

Estimating operation 160 may then repeat the above-described steps using alternative random subsets of candidate raised pavement markers 110 to generate additional candidate splines. Estimating operation 160 may finally select the candidate spline that has the highest fitting score. FIG. 3 shows candidate splines 161, 162 that had relatively low fitting score, and a candidate spline that had the highest fitting score that was selected as an estimation 68 for lane boundary 25. In certain implementations, agglomerative clustering may be used, in which close clusters having a distance smaller than a predefined threshold are merged.

In other exemplary implementations, the RANSAC implementation may not select subsets of candidate raised pavement markers 110 entirely at random before fitting candidate splines. Instead, estimating operation 160 may incorporate statistical information from look-up table 80 to guide the selection of candidate raised pavement markers 110 during the RANSAC processing, and thereby improve the likelihood that the selections made are consistent with the actual lane boundary 25. The look-up table 80 is generated by look-up table module 75 according to a look-up table creation process 285, shown in FIGS. 5A-B. Look-up table creation process 285, and the manner by which estimating operation 160 may incorporate information from look-up table 80, will be discussed in further detail below.

In addition to determining an estimation 68 of the course of lane boundary 25, estimating operation 160 may also foam a estimation of the type of lane boundary 25. Generally, lane boundaries may come in a variety of forms, including centerlines of two-lane highways, lanelines of multi-lane highways, no-passing lanes in which passing is not permitted in one direction, no-passing lanes in which passing is not permitted in both directions, and the like. These different types of lanes may be signified by respective patterns of non-reflective raised pavement markers 35 and reflective raised pavement markers 40. Image processing module 55 may include a database 82 having sample data showing the types of lane boundaries signified by different patterns of non-reflective raised pavement markers 35 and reflective raised pavement markers 40.

Estimating operation 160 may compare candidate raised pavement markers 110 to entries in database 82 to find a pattern of non-reflective raised pavement markers 35 and reflective raised pavement markers 40 that most closely match candidate raised pavement markers 110. Estimating operation 160 may then form an estimation of a lane boundary type for lane boundary 25. In this example, estimating operation 160 has selected "Center Line—2-lane highway" as the estimated lane boundary type.

Image-based process 85 then proceeds to splitting operation 165, in which image processing module 55 splits estimation 68 into segments $s_{I,1}, s_{I,2}, s_{I,3}, \ldots, s_{I,N}$. Varying lengths for segments $s_{I,1}, s_{I,2}, s_{I,3}, \ldots, s_{I,N}$ can be selected in varying implementations, but in illustrative embodiments, segments $s_{I,1}, s_{I,2}, s_{I,3}, \ldots, s_{I,N}$ are chosen to be of equal length corresponding to 2 meters of roadway distance.

Finally, image-based process 85 proceeds to modeling operation 170, in which image processing module 55 models estimation 68 with an image-based probabilistic model 57. In this illustrative embodiment, image-based probabilistic model 57 is formed from a mixture of Gaussian distributions $G_{I,1}, G_{I,2}, \ldots, G_{I,N}$, with each Gaussian distribution $G_{I,n}$ formed based on a corresponding segment $s_{1,n}$. By way of example, image processing module 55 may assign mean values for each Gaussian $G_{I,n}$ based on an (x,y) location and an angle of rotation θ relative to an x-axis for a corresponding segment $s_{I,n}$, and may also assign predetermined variances for each Gaussian $G_{I,n}$. FIG. 3 graphically depicts image-based probabilistic model 57 as a topographic, elevation view of a probability distribution formed by mixing Gaussians $G_{I,1}, G_{1,2}, \ldots, G_{I,N}$. Other types of probability distributions are also within the scope of the present disclosure.

As explained, image-based probabilistic model 57 is fused with a lidar-based probabilistic model 62 to generate an estimation 70 of lane boundary 25. Lidar-based probabilistic model 62 is generated using lidar-based process 175, shown in FIG. 4. Lidar-based process 175 begins with capturing operation 180, in which lidar detector 50 captures frames of lidar data within detection cone 137, shown in FIG. 1. As explained, lidar detector 50 is, in this illustrative example, a two-dimensional lidar detector having three detection layers 51, 52, 53. Each hit point of lidar data may include information on intensity of light reflected by targets within detection layers 51, 52, 53. As will be explained below, detection of reflective intensity is relevant to the present disclosure, because high intensity clusters are considered candidate raised pavement markers.

Any suitable lidar detector 50 is within the scope of the present disclosure, and in illustrative embodiments, lidar detector 50 has a horizontal detection angle γ of about 160°, as shown in FIG. 1, which may be larger than the horizontal angle of view of camera 45, thus allowing lidar detector 50 to detect reflective raised pavement markers 40 that are out of range for camera 45. In illustrative embodiments, lidar detector 50 is able to reliably detect reflective raised pavement markers 40 at a range of about 100 m or more within an accuracy of about 10 cm. This may provide additional range beyond what camera 45 may be able to resolve for raised pavement markers 35, 40. Thus, lidar detector 50 may have a substantially greater longitudinal range than camera 45.

In this illustrative embodiment, lidar detector 50 is able to detect reflective raised pavement markers 40 due to their reflective properties. Lidar detector 50 may not be able to detect non-reflective raised pavement markers 35 because they may not have reflective properties. In certain roadway environments, however, non-reflective raised pavement markers 35 may, despite being considered non-reflective, have sufficient reflectivity as to be detected by lidar detector 50. While lane boundary detection system 10 may make use of such data when available, lidar readings for non-reflective raised pavement markers 35 will typically be low intensity and not as stable as lidar readings for reflective raised pavement markers 40.

Because detection layers 51, 52, 53 may not be contiguous, a given frame of lidar data may not necessarily include data for all reflective raised pavement markers 40. FIG. 1 illustrates a time instance in which a frame of lidar data would capture reflective raised pavement marker 40b (within detection layer 52) and reflective raised pavement marker 40c (within detection layer 53). However, it would not capture reflective raised pavement marker 40a, which is not within any of the detection layers 51, 52, 53. As vehicle 15 proceeds forward, reflective raised pavement marker 40a may subsequently fall within detection layer 51, and thus be included within a subsequent frame of lidar data.

After capturing operation 180, lidar-based process 175 proceeds to segmenting operation 185, in which lidar processing module 60 segments captured lidar data into clusters. To segment captured lidar data, lidar processing module 60 may group adjacent portions of each frame of lidar data that have similar intensities into clusters.

Lidar-based process 175 then proceeds to identifying operation 190, in which small clusters of sufficient intensity are identified as candidate raised pavement markers 195. Identifying operation 190 may use a minimum intensity threshold, with clusters having intensity higher than the intensity threshold being further considered. Lidar processing module 60 may be pre-programmed with minimum and maximum size thresholds, such that any clusters having size less than the maximum size threshold and greater than the minimum size threshold are identified as candidate raised pavement markers 195. The above-described thresholds may be determined by machine learning methodologies, such as support vector machine, or may be determined empirically.

Lidar-based process 175 proceeds to transforming operation 205, in which the lidar data being processed is transformed into a vehicle coordinate system (i.e., top-down or "birds eye" perspective), to facilitate subsequent processing. Transforming operation 205 may be calibrated based on a mounted position of the lidar detector 50, including its x,y, and z coordinate locations, its yaw, its roll, and/or its pitch.

Figure 4:
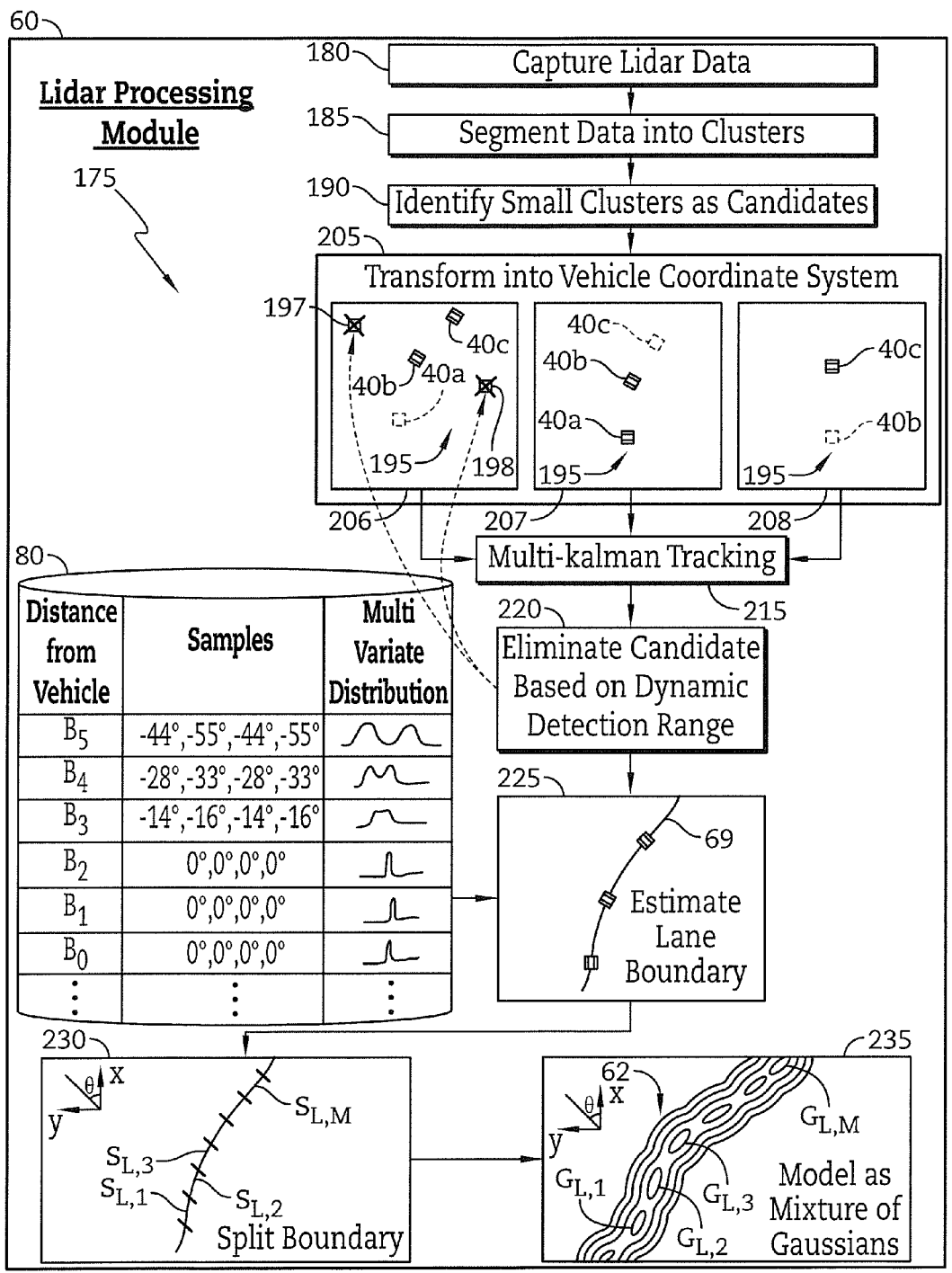
FIG. 4 is a diagrammatic view of a lidar-based process performed by the lidar processing module in accordance with the present disclosure showing that the lidar-based process includes the operations of capturing lidar data, segmenting the lidar data into clusters, identifying small clusters as candidate raised pavement markers, transforming the data into a vehicle coordinate system, tracking the candidate raised pavement markers, eliminating false positives among the set of candidate raised pavement markers, estimating a lane boundary, splitting the estimated lane boundary into segments, and modeling the estimated lane boundary as a mixture of Gaussians.

Exemplary outputs 206, 207, 208 of transforming operation 120 are shown in FIG. 4. Outputs 206, 207, 208 correspond to consecutively captured frames of lidar data, with output 206 corresponding to a first point in time, output 207 corresponding to a second point in time in which vehicle 15 is further advanced along roadway 20, and output 208 corresponding to a third point in time, in which vehicle 15 is still further advanced along roadway 20. In output 206, reflective raised pavement marker 40a is not within any of detection layers 51, 52, 53, and so is not detected as a candidate raised pavement marker 195. Similarly, in output 207, reflective raised pavement marker 40c is not within any of detection layers 51, 52, 53, and in output 208, reflective raised pavement marker 40b is not within any of detection layers 51, 52, 53.

Image-based process 85 then proceeds to tracking operation 215, in which lidar processing module 60 tracks each of the candidate raised pavement markers 195 over the course of sequential outputs 206, 207, 208. In this illustrative embodiment, tracking operation 215 employs a multi-Kalman filter, but other filter object detection and tracking methodologies are within the scope of the present disclosure. Tracking operation 215 allows lidar processing module 60 to more efficiently and accurately track the position of candidate raised pavement markers 195 over the course of sequential frames of lidar data, without needing to re-detect candidate raised pavement markers 195 anew for each consecutive frame of lidar data. In exemplary implementations, a candidate raised pavement markers 195 must be detected over the course of at least two frames of lidar data before being considered an actual reflective raised pavement marker 40 such that it is used in estimating operation 225 (to be discussed below). Generally, the more times a candidate raised pavement markers 195 is detected, the higher the probability that the candidate raised pavement markers 195 corresponds to an actual reflective raised pavement marker 40.

Lidar-based process 175 then proceeds to eliminating operation 220, in which false positives 197, 198 are removed from the set of candidate raised pavement markers 195. In this illustrative embodiment, eliminating operation 220 removes false positives based on a dynamic detection range of lidar detector 50, similar to what was described for eliminating operation 132 of image-based process 85, shown in FIG. 3 and described with reference to FIGS. 1 and 7. In this example, false positive 197 may be caused by headlight 113 of vehicle 159, and false positive 198 may be caused by reflective portion 112 of guard rail 164 (as depicted in FIG. 3). False positive 197 is removed because it is within occluded region 169 (shown in FIG. 1), and therefore outside of the dynamic detection range of lidar detector 50. Similarly, false positive 198 is removed because it is within occluded region 174 (shown in FIG. 1), and therefore outside of the dynamic detection range of lidar detector 50.

Lidar-based process 175 then proceeds to estimating operation 225, in which lidar processing module 60 forms an estimation 69 of lane boundary 25. Estimating operation 225 may be similar to estimating operation 160 for image-based process 85, shown in FIG. 3. For example, estimating operation 225 may apply the RANSAC algorithm to sequentially identify candidate splines and select a spline as estimation 69.

A difference between lidar-based estimating operation 225 and image-based estimating operation 160 is that lidar-based estimating operation may have fewer candidate raised pavement makers 195 with which to fit splines, because lidar-based process 175 may only processes reflective raised pavement markers 40, not non-reflective raised pavement markers 35. In many roadway environments, reflective raised pavement markers 40 may be located far apart from one another (e.g., 24 feet or more), causing estimating operation 225 to have a lower density of candidate raised pavement makers 195 with which to fit splines. On the other hand, lidar detector 50 may have a longer range than camera 45, meaning lidar-based process 175 may have detected additional reflective raised pavement markers 40 that image-based process 85 did not detect. This may provide lidar-based process 175 with additional information unavailable to image-based process 85. Lidar-based process 175 and image-based process 85 each may therefore operate on different sets of data. However, estimations from both lidar-based process 175 and image-based process 85 are ultimately fused by fusing module 65. Thus, lane boundary detection system 10 is able to form estimations that exploit the strengths of both image-based processing and lidar-based processing combined with the provided lane boundaries from camera 45.

As with estimating operation 160 of image-based process 85, estimating operation 225 of lidar-based process 175 may also query look-up table 80 to incorporate statistical information from look-up table 80 during the RANSAC processing. Because reflective raised pavement markers 40 may be located relatively far apart, additional guidance from look-up table 80 during spline fitting may be particularly advantageous for lidar-based process 175. Look-up table creation process 285, and the manner by which estimating operation 225 may incorporate information from look-up table 80, will be discussed in further detail below.

Lidar-based process 175 then proceeds to splitting operation 230, in which lidar processing module 60 splits estimation 69 into segments $s_{L,1}, s_{L,2}, s_{L,3}, \ldots, s_{L,M}$. Varying lengths for the segments $s_{L,1}, s_{L,2}, s_{L,3}, \ldots, s_{L,M}$ can be selected in varying implementations, but in illustrative embodiments, segments $s_{L,1}, s_{L,2}, s_{L,3}, \ldots, s_{L,M}$ are chosen to be of equal length corresponding to 2 meters of roadway distance.

Finally, lidar-based process 175 proceeds to modeling operation 235, in which lidar processing module 60 models estimation 69 with a lidar-based probabilistic model 62. In this illustrative embodiment, lidar-based probabilistic model 62 is formed from a mixture of Gaussian distributions $G_{L,1}, G_{L,2}, \ldots, G_{L,M}$, with each Gaussian distribution $G_{L,1}, G_{L,2}, \ldots, G_{L,M}$ formed based on a corresponding segment $s_{L,1}, s_{L,2}, s_{L,3}, \ldots, s_{L,M}$. By way of example, lidar processing module 60 may assign mean values for each Gaussian $G_{L,m}$ based on (x,y) locations and an angle of rotation $\theta$ relative to an x-axis for a corresponding segment $s_{L,m}$, and assign predetermined variances for each Gaussian $G_{L,m}$. FIG. 4 graphically depicts lidar-based probabilistic model 62 as a topographic, elevation view of a probability distribution formed by mixing Gaussians $G_{L,1}, G_{L,2}, \ldots, G_{L,M}$.

Figure 6A:
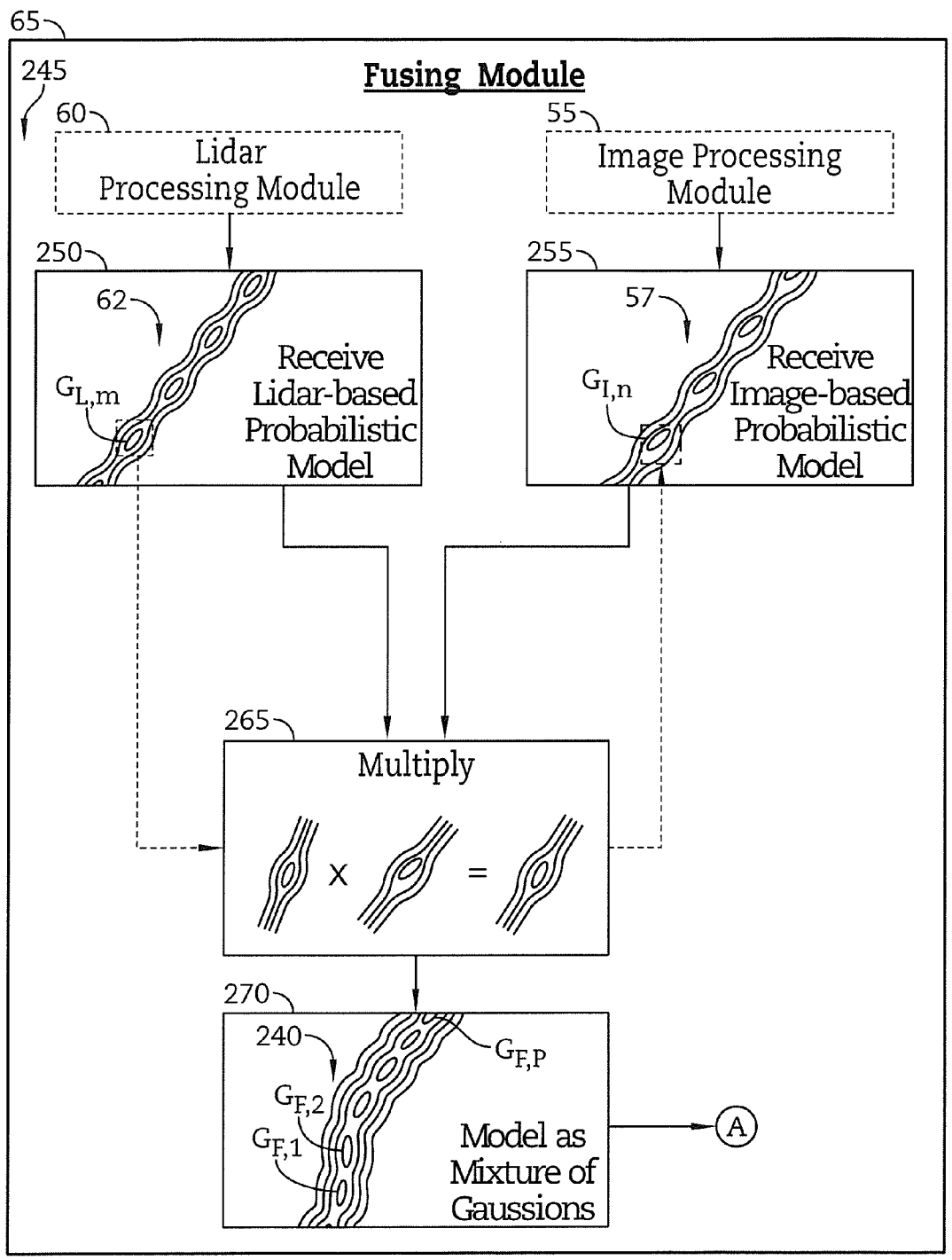
FIG. 6A is a diagrammatic view of a fusing process performed by the fusing module in accordance with the present disclosure, showing that the fusing process includes the operations of receiving a lidar-based probabilistic model, receiving an image-based probabilistic model, multiplying the probabilistic models to generate fused Gaussian distributions, and modeling the fused Gaussian distributions as a first mixture of Gaussian distributions.
Figure 6B:
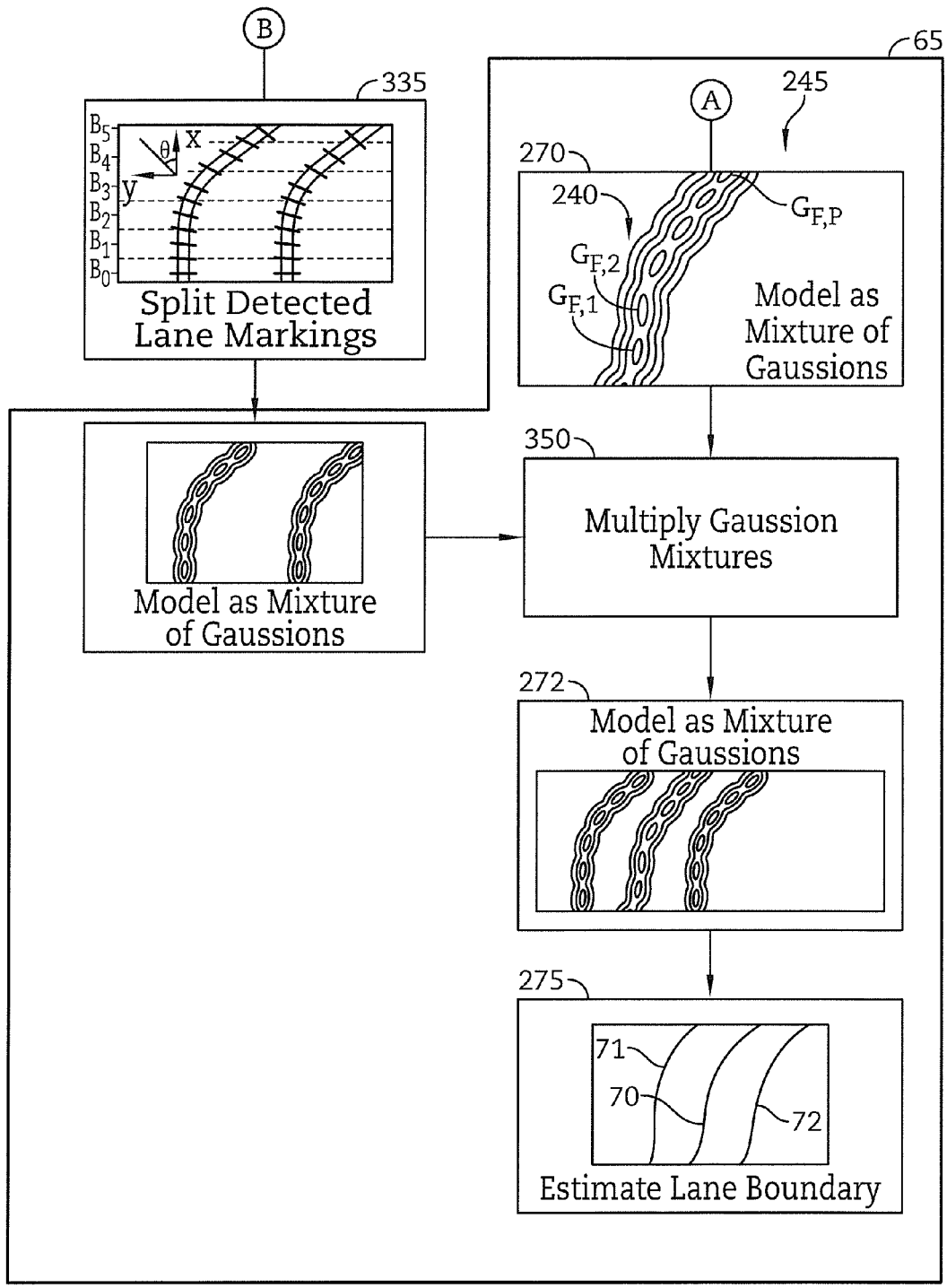
FIG. 6B is a continuation of the diagrammatic view of the fusing process depicted in FIG. 6A, and shows that the fusing process further includes the operations of receiving results of a splitting operation based on painted lane markings, modeling the results of the splitting operation as a second mixture of Gaussians, multiplying the first mixture of Gaussian distributions and second mixture of Gaussian distributions to arrive at a fused mixture of Gaussian distributions, and estimating lane boundaries and roadway borders based on the fused mixture of Gaussian distributions.

After image-based probabilistic model 57 and lidar-based probabilistic model 62 have been generated, lane boundary detection system 10 includes means for fusing image-based probabilistic model 57 and lidar-based probabilistic model 62 and estimating lane boundaries, such as fusing module 65. Fusing module 65 fuses image-based probabilistic model 57 and lidar-based probabilistic model 62 to form a fused probabilistic model 240, as shown in FIGS. 6A-B. By combining probabilistic information from two sources for a given segment of lane boundary 25, lane boundary detection system 10 can provide more reliable and accurate estimations of lane boundary 25.

Fusing process 245 begins with receiving operations 250, 255 in which fusing module 65 receives image-based probabilistic model 57 and lidar-based probabilistic model 62 from image processing module 55 and lidar processing module 60, respectively. Fusing process 245 proceeds to multiplying operation 265, in which image-based probabilistic model 57 and lidar-based probabilistic model 62 are multiplied to determine or approximate a product. Various techniques may be used to determine or approximate a product, such as Exact Product, Gibbs Sampling, and Epsilon-Exact Sampling.

In one exemplary implementation, multiplying operation makes use of a nearest neighbor approach. In such an implementation, fusing module 65 identifies nearest neighbors among Guassians $G_{I,1}, G_{I,2}, \ldots, G_{I,N}$ and Gaussians $G_{L,1}, G_{L,2}, \ldots, G_{L,M}$, respectively. Fusing module 65 identifies nearest neighbors in order to identify Gaussians $G_{I,n}$ from image-based process 85 and Gaussians $G_{L,m}$ from the lidar-based process 175 that correspond to the same or similar portions of lane boundary 25. Multiplying operation 265 may implement a K-D tree nearest neighbor algorithm, in which each node of the K-D tree may include data for a given one of the Gaussians $G_{I,1}, G_{I,2}, \ldots, G_{I,N}, G_{L,1}, G_{L,2}, \ldots, G_{L,M}$, and each node may include the mean x-axis location, mean y-axis location, and mean angle of rotation θ used to formulate each of the Gaussians $G_{1,1}, G_{1,2}, \ldots, G_{1,N}, G_{L,1}, G_{L,2}, \ldots, G_{L,M}$. FIG. 6A illustrates an exemplary lidar-based Gaussian $G_{L,m}$ and image-based Gaussian $G_{I,n}$ that were identified as nearest neighbors. Each nearest neighbor pair of Gaussians ($G_{L,m}, G_{I,n}$) may be multiplied to arrive at a sequence of fused Gaussians $G_{F,1}, G_{F,2}, \ldots G_{F,P}$.

Fusing process 245 may then proceeds to modeling operation 270, in which sequence of fused Gaussians $G_{F,1}, G_{F,2}, \ldots, G_{F,P}$ are mixed to form a fused probabilistic model 240, graphically depicted in FIG. 6A as a topographic, elevation view of the resulting probability distribution.

FIG. 6B shows the remainder of fusing process 245. Fusing process 245 may not only fuse image-based probabilistic model 57 and lidar-based probabilistic model 62, but may also fuse a roadway border probabilistic model 242 that is based on roadway borders 27, 29. Thus, for example, fusing process may receive the results of splitting operation 335, which, as will be explained in connection with FIG. 5A below, is used in connection with look-up table module 75. Generally, and as will be explained in more detail below, the results of splitting operation 335 include segments $s_{P,1}, s_{P,2}, \ldots, s_{P,Q}$ that correspond to portions of roadway borders 27, 29. The results of splitting operation 335 are provided as inputs to a modeling operation 345, which creates a roadway border probabilistic model 242 for roadway borders 27, 29 by modeling the segments $s_{P,1}, s_{P,2}, \ldots, s_{P,Q}$ as a mixture of Gaussians $G_{P,1}, G_{P,2}, \ldots, G_{P,Q}$, with each Gaussian distribution $G_{P,q}$ formed based on a corresponding segment $s_{P,q}$. The manner by which the segments $s_{P,1}, S_{P,2}, \ldots, S_{P,Q}$ are modeled as a mixture of Gaussians $G_{P,1}, G_{P,2}, \ldots, G_{P,Q}$ is similar to modeling operation 170, shown in FIG. 3.

Fusing process 245 may proceed to another multiplying operation 250, which multiplies fused probabilistic model 240 with roadway border probabilistic model 242. Fusing process 245 may then proceed to modeling operation 272, which models the result of multiplying operation 250 as a second fused probabilistic model 243. Second fused probabilistic model 243 statistically models both lane boundary 25 and roadway borders 27, 29. Multiplying operation 250 may use a variety of techniques to compute or approximate a product, such as Exact Product, Gibbs Sampling, Epsilon-Exact Sampling, or nearest neighbor approaches.

Fusing process 245 then proceeds to estimating operation 275, in which fusing module 65 generates an estimation 70 for lane boundary 25 based on fused probabilistic model 240 and/or second fused probabilistic model 243, an estimation 71 for painted roadway border 27 based on second fused probabilistic model 243, and an estimation 72 for painted roadway border 29 based on second fused probabilistic model 243. In exemplary implementations, estimating operation 275 employs a RANSAC algorithm, similar to estimating operations 160, 225 of image-based process 85 and lidar-based process 175, discussed above. Whereas estimating operations 160, 225 used candidate raised pavement markers 110, 195 as sample data for RANSAC, estimating operation 275 may instead use mean values for Gaussians that comprise fused probabilistic model 240 and/or second fused probabilistic model 243.

Thus, the result of estimation operation 275 is an estimation 70 for lane boundary 25 that harnesses information from both camera 45 and lidar detector 50, and that harnesses statistical processing from both image-based process 85 and lidar-based process 175. Estimation operation 275 also produces estimations 71, 72 of roadway borders 27, 29. The result is a lane boundary detection system 10 that provides superior accuracy, reliability, and range than each type of detector or processing could offer on its own.

Figure 5A:
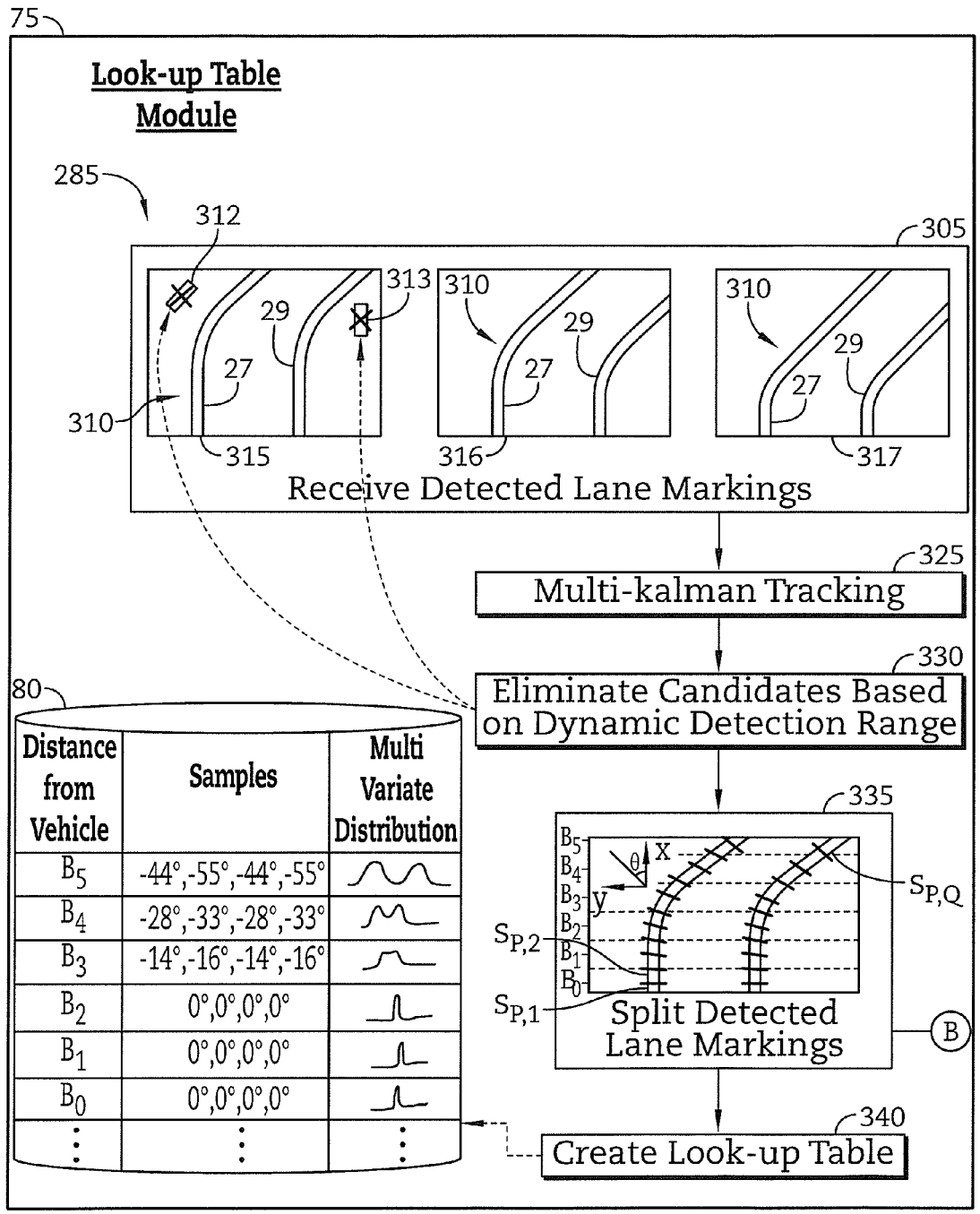
FIG. 5A is a diagrammatic view of a look-up table creation process performed by a look-up table module in accordance with the present disclosure, showing that the look-up table creation process includes the operations of receiving detected lane markings, tracking the detected lane markings, eliminating false positives among the detected lane markings, splitting the detected lane markings into segments, and creating a look-up table containing statistical information about the segments.
Figure 5B:
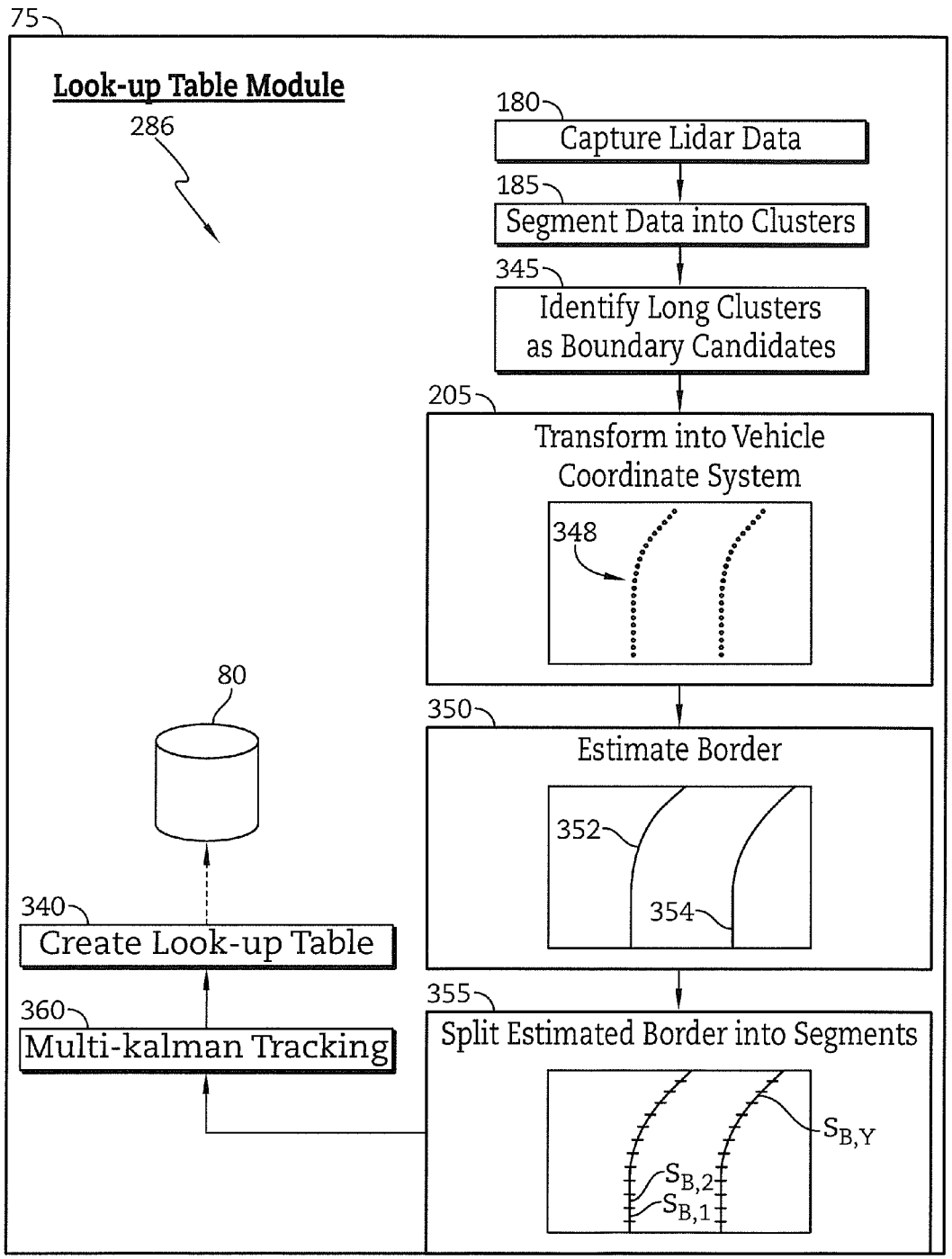
FIG. 5B is a diagrammatic view of an alternative implementation of a look-up table creation process in accordance with the present disclosure, showing that the alternative look-up table creation process includes the operations of capturing lidar data, segmenting the captured data into clusters, identifying long clusters as boundary candidates, transforming data into a vehicle coordinate system, estimating roadway borders, splitting estimated roadway borders into segments, tracking the segments, and creating a look-up table containing statistical information about the segments.

As explained, lane boundary detection system 10 may improve the performance of estimation operations 160, 225 through the use of look-up table 80, shown in FIGS. 5A-B. Look-up table 80 includes sample information regarding painted roadway borders 27, 29 that provide additional information regarding the course of lane boundary 25. This additional information may aid in the selection of candidate raised pavement markers 110, 195 during iterations of RANSAC. Rather than randomly selecting candidate raised pavement markers 110, 195, look-up table 80 may help guide lane boundary detection system 10 in selecting candidate raised pavement markers 110, 195 that are more likely to follow lane boundary 25.

FIG. 5A shows a look-up table creation process 285, which begins with a receiving operation 305, in which look-up table module 75 receives candidate painted lane marking detections 310 from camera 45. As explained, camera 45 may be of the type available from KOSTAL® Group of Lüdenscheid, Germany, which may be equipped to provide candidate painted lane markings 310 to look-up table module 75. Examples of techniques that may be used to identify candidate painted lane markings 310 include edge-detection techniques, ridge-detection techniques, or other feature extraction and identification methodologies. For example, lane markings on roadways are often painted white, such that the pixel intensity for portions of the image data corresponding to lane markings may sharply differ from the pixel intensity of other portions of the image data. Such differences give rise to discontinuities, near-discontinuities, or sharp gradients in pixel intensity at locations in the image data corresponding to lane markings. Such features may be used to identify candidate painted lane markings 310. Candidate painted lane markings 310 may include both actual painted roadway borders 27, 29, and false positives 312, 313.

Exemplary outputs 315, 316, 317 of receiving operation 305 are shown in FIG. 5A. Outputs 315, 316, 317 correspond to consecutively captured frames of image data, with output 315 corresponding to a first point in time, output 316 corresponding to a second point in time in which vehicle 15 is further advanced along roadway 20, and output 317 corresponding to a third point in time, in which vehicle 15 is still further advanced along roadway 20.

Look-up table creation process 285 then proceeds to tracking operation 325, in which look-up table module 75 tracks each of the candidate painted lane markings 310 over the course of sequential outputs 315, 316, 317. In this illustrative embodiment, tracking operation 325 employs a multi-Kalman filter, but other filter object detection and tracking methodologies are within the scope of the present disclosure. Tracking operation 325 allows look-up table module 75 to more efficiently and accurately track the position of candidate painted lane markings 310 over the course of sequential frames of image data 92, without needing to re-detect candidate painted lane markings 310 anew for each consecutive frame of image data.

Look-up table creation process 285 then proceeds to eliminating operation 330, in which false positives 312, 313 are removed from the set of candidate painted lane markings 310 based on the dynamic detection range of lidar detector 50. Eliminating operation 330 is similar to eliminating operations 132, 220 discussed in connection with FIGS. 3 and 4. In this illustrative example, false positive 312 is in occluded region 169, and false positive 313 is in occluded region 174, meaning false positives 312, 313 are outside the dynamic detection range of lidar detector 50. As such, eliminating operation 330 removes them from the set of candidate painted lane markings 310, as illustrated by way of X's in FIG. 5A.

Look-up table creation process 285 then proceeds to splitting operation 335, in which remaining candidate painted lane markings 310 are split into segments $s_{P,1}$, $s_{P,2}$, ..., $s_{P,Q}$. Varying lengths for the segments $s_{P,1}$, $s_{P,2}$, ..., $s_{P,Q}$ may be chosen, but in illustrative embodiments, segments $s_{P,1}$, $s_{P,2}$, ..., $s_{P,Q}$ are chosen to be equal in length and to correspond to 2 meters in roadway distance.

Look-up table creation process 285 then proceeds to creation operation 340, in which look-up table module 75 creates look-up table 80. Look-up table 80 includes sample information regarding each of the segments $s_{P,q}$, with one item of sample information corresponding to each segment $s_{P,q}$. Look-up table 80 may group each of the segments $s_{P,q}$ based on how far away each segment $s_{P,q}$ is from vehicle 15.

In this example, six distance ranges are shown, designated as $B_0$, $B_1$, $B_2$, $B_3$, $B_4$, $B_5$, and $B_6$. Within each distance range, there are four segments $s_{P,q}$. Thus, look-up table 80 includes four samples for each of the distance ranges $B_1$-$B_6$. For each of the segments $s_{P,q}$ within a given distance range, look-up table module 75 records sample information for that segment $s_{P,q}$ in look-up table 80. In this example, the sample information includes an angle of orientation θ of each of the segments $s_{P,q}$ relative to an x-axis. Thus, the samples stored in look-up table 80 may help approximate the angle of trajectory of lane boundary 25 for each of the distance ranges recorded in look-up table 80.

Look-up table 80 also includes a sequence of Gaussian mixtures $G_{D,1}$, $G_{D,2}$, ..., $G_{D,R}$, with one Gaussian mixture $G_{D,r}$ formulated for each distance range in look-up table 80. Each Gaussian mixture $G_{D,r}$ may be formed as a multivariate distribution for the samples recorded in look-up table 80 for that distance range.

Look-up table 80 may be used to improve the performance of estimation operation 160 of image-based process 85, shown in FIG. 3, and the performance of estimation operation 225 of lidar-based process 175, shown in FIG. 4. With reference to FIG. 3, as explained, estimating operation 160 may apply a RANSAC algorithm. As previously described, in implementing RANSAC, estimating operation 160 may first randomly select a subset of candidate raised pavement markers 110. With the use of look-up table 80, however, estimating operation 160 may not make its selections entirely randomly, but may instead factor input from look-up table 80.

Thus, for example, estimating operation 160 may select one of the candidate raised pavement markers 110 having a location on roadway 20 that may be represented by coordinates ($x_{current\_sample}$, $y_{current\_sample}$). Estimating operation 160 may determine how far from vehicle 15 the location ($x_{current\_sample}$, $y_{current\_sample}$) is, and consult look-up table 80 to obtain an estimate on the relative angular trajectory of lane boundary 25 at that distance. For example, if the selected candidate raised pavement marker 110 was 25 m away from vehicle 15, estimating operation 160 would consult the row of look-up table 80 for the distance range of 20 m-30 m. Estimating operation 160 may then refer to the Gaussian mixture $G_{D,r}$ for that row, and draw a sample $θ_{sample}$ according to the Gaussian $G_{D,r}$. The sample $θ_{sample}$ provides an estimate on the angular trajectory of lane boundary 25 at the location ($x_{current\_sample}$, $y_{current\_sample}$).

Estimating operation 160 may then compute an estimated location ($x_{next}$, $y_{next}$) for a subsequent candidate raised pavement marker 110 that is likely to lie on lane boundary 25, according to the following equation: ($x_{next}$, $y_{next}$)= ($x_{current\_sample}$, $y_{current\_sample}$)+(sin($θ_{sample}$), cos($θ_{sample}$))× L. Here, L is a predetermined query length parameter that may be selected based on an expected distance between raised pavement markers 35, 40 along lane boundary 25.

Estimating operation 160 then searches near location ($x_{next}$, $y_{next}$) to find an additional candidate raised pavement marker 110 near the location ($x_{next}$, $y_{next}$), which is used as an additional sample for the RANSAC iteration. The above-described process can be repeated based on the newly added candidate raised pavement marker 110 to identify still additional candidate raised pavement markers 110, until a sufficient number of candidate raised pavement markers 110 have been selected for use in the RANSAC iteration and/or until additional candidate raised pavement markers 110 cannot be identified. Either way, a spline can be fit onto the selected candidate raised pavement markers 110. In certain implementations, a threshold may be applied to rule out splines that have fewer than a minimum number of samples. However, it should be understood that a different threshold may be selected for different for estimating operation 160, estimating operation 225, and estimating operation 275, because they may have different types of input data and different expected distances between data points.

In an exemplary implementation, estimating operation 160 may generate a certain number of (e.g., five) candidate splines by following the above-described process, in which information from look-up table 80 is incorporated. Estimating operation 160 may also generate a certain number of (e.g., five) additional candidate splines where candidate raised pavement markers 110 are selected entirely at random for RANSAC processing. Estimating operation 160 may then select the candidate spline having the highest fitting score.

As shown in FIG. 4, estimating operation 225 in lidar-based process 175 may similarly consult look-up table 80 when selecting candidate raised pavement markers 195 for use in RANSAC implementations of estimating operation 225. Estimating operation 225 may use look-up table 80 in similar fashion as estimating operation 160 of image-based process 85. However, the predetermined query length parameter L may be set at a higher value, to account for reflective raised pavement markers 40 generally being located farther apart from one another as compared to the combined set of reflective and non-reflective raised pavement markers 35, 40.

FIG. 5B shows a look-up table creation process 286 that may be used as an alternative to look-up table creation process 285 shown in FIG. 5A. Whereas look-up table creation process 285 used painted roadway borders 27, 29 to create look-up table 80, look-up table creation process 286 uses lidar-based detections of boundary structures 31, 32 to create look-up table 80.

Look-up table creation process 286 may include capturing operation 180, in which lidar detector 50 captures frames of lidar data, and segmenting operation 185, in which lidar processing module 60 segments captured lidar data into clusters, as described above in connection with FIG. 5B. Look-up table creation process 286 may then proceed to identifying operation 345, in which look-up table module 75 identifies long clusters as boundary candidates 348. Long clusters are identified because long clusters may correspond to lidar-based detections of boundary structures 31, 32.

Look-up table creation process 286 then proceeds to transforming operation 205, in which the lidar data being processed is transformed into a vehicle coordinate system, as was discussed on connection with FIG. 4. Look-up table creation process 286 proceeds to an estimating operation 350, in which estimations 352, 354 are generated based on boundary candidates 348. Estimating operation 350 may be implemented in similar fashion as estimating operation 160 for image-based process 85, shown in FIG. 3. For example, estimating operation 350 may apply the RANSAC algorithm to sequentially identify candidate splines and select splines as estimations 352, 354.

Look-up table creation process 286 may proceed to splitting operation 355, in which estimations 352, 354 are split into segments $s_{B,1}, \ldots, s_{B,Y}$. As explained in connection with other segmenting operations, the length of segments may vary, but in exemplary implementations are set to roadway distances of 2 m. Look-up table creation process 286 may then proceed to tracking operation 360, in which the segments $s_{B,1}, \ldots, s_{B,Y}$ are tracked over time from one frame of lidar data to the next. Look-up table creation process 286 may then proceed to creating operation 340, described above in connection with look-up table creation process 285 of FIG. 5A. Whereas look-up table creation process 285 used segments $s_{P,q}$ corresponding to roadway borders 27, 29, look-up table creation process 285 uses segments $s_{P,q}$ corresponding to boundary structures 31, 32. The result of creating operation 340 is look-up table 80. Though look-up table creation process 285 of FIG. 5A and look-up table creation process 286 of FIG. 5B may result in similar data being populated within look-up table 80, there may be differences, as look-up table creation process 285 is based on painted roadway borders 27, 29, and look-up table creation process 286 is based on boundary structures 31, 32.

Thus, as explained above, lane boundary detection system 10 forms a estimation 70 of lane boundary 25, an estimation 71 of roadway border 27, and an estimation 72 of roadway border 29. Vehicle 15 may make use of estimations 70, 71, 72 in a variety of ways. For example, vehicle 15 may include an autonomous driving system responsible for maintaining vehicle 15 within its lane 24. Such an autonomous driving system may use estimations 70, 71, 72 of lane boundary 25 to inform steering decisions for that purpose. Alternatively, vehicle 15 may include a lane change warning system, which notifies a driver when vehicle 15 may inadvertently be switching into a new lane. Such a lane change warning system may make use of estimations 70, 71, 72 of lane boundary 25 to determine when vehicle 15 is switching from lane 24 to lane 22.

The above-described components, including image processing module 55, lidar processing module 60, and fusing module 65, may be implemented in software, compiled and stored to a memory as object code, and during operation of the vehicle, may be invoked for execution by one or more processors. In one implementation, the above-described components are implemented as a single system on a chip. The interconnections among the above-described components can be provided through any suitable electronic communication mechanism, such as a communication bus. Thus, the lane boundary detection system 10 may be implemented as software complied into object code on one or more memories that, during runtime, are invoked for execution by one or more processors, such that all systems are provided in a common chip package. Where the lane boundary detection system 10 is provided in separate hardware modules, they may communicate with one another through any suitable electronic communication mechanism, such as a communication bus.

Whether implemented as one chip module or multiple chip modules, the lane boundary detection system 10 may be provided in any convenient location in vehicle 15, such as behind a dashboard near other electronic circuitry. Such a location may be beneficial for providing convenient access to a power source, and to the electronic systems controlling the vehicle's driving.

Look-up table 80 and database 82 may be stored programmatically on any computer memory, and in certain implementations may be implemented in a database using any known database environment, such as Oracle, DB2, or SQL Server.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for estimating and tracking a lane boundary formed of pavement markers disposed on a roadway, the system comprising:
   a camera located on a vehicle for obtaining image data along the roadway regarding stationary reflective raised pavement markers and non-reflective raised pavement markers as the vehicle advances along the roadway;
   an image processor for processing frames of image data captured along the roadway over time by the camera and generating a first probabilistic model for the lane boundary;

a lidar detector located on the vehicle for obtaining lidar data along the roadway regarding stationary reflective raised pavement markers as the vehicle advances along the roadway;

a lidar processor for processing frames of lidar data captured along the roadway over time by the lidar detector and generating a second probabilistic model for the lane boundary; and means for fusing the first probabilistic model and the second probabilistic model to generate a fused probabilistic model and for estimating and tracking the lane boundary based on the fused probabilistic model;

wherein the first probabilistic model includes a first mixture of Gaussian distributions;

the second probabilistic model includes a second mixture of Gaussian distributions; and the means for fusing the first probabilistic model and the second probabilistic model includes a processor and a non-transitory data storage on which is stored computer code which, when executed on the processor, causes the in-vehicle system to compute a product of the first probabilistic model and the second probabilistic model.

2. The in-vehicle system of claim 1, wherein the image processor is in communication with a first non-transitory data storage on which is stored computer code which, when executed on the image processor, causes the image processor to generate the first probabilistic model by:
identifying candidate reflective and non-reflective raised pavement markers;
fitting a first spline to the candidate reflective and non-reflective raised pavement markers;
segmenting the first spline; and
mixing a first set of probability distributions generated based on respective segments of the first spline.

3. The in-vehicle system of claim 2, wherein the lidar processor is in communication with a second non-transitory data storage on which is stored computer code which, when executed on the lidar processor, causes the lidar processor to generate the second probabilistic model by:
identifying candidate reflective raised pavement markers;
fitting a second spline to the candidate reflective raised pavement markers;
segmenting the second spline; and
mixing a second set of probability distributions generated based on respective segments of the second spline.

4. The in-vehicle system of claim 3, further comprising a database containing statistical information regarding angular trajectories of the roadway, wherein the first non-transitory data storage and the second non-transitory data storage include respective computer code which, when executed, causes the image processor and the lidar processor to fit the first and second splines based on the statistical information stored in the database.

5. An in-vehicle system for estimating a lane boundary on a roadway, the system comprising:
one or more detectors located on a vehicle that capture image data and lidar data of raised pavement markers along the roadway over time as the vehicle advances along the roadway;
a processor and a non-transitory data storage on which is stored computer code which, when executed on the processor, causes the in-vehicle system to:
generate a first probabilistic model for the lane boundary based on the image data;
generate a second probabilistic model for the lane boundary based on the lidar data;
fuse the first probabilistic model and the second probabilistic model to generate a fused probabilistic model; and
estimate and track the lane boundary based on the fused probabilistic model;
wherein the first probabilistic model includes a first mixture of Gaussian distributions;
the second probabilistic model includes a second mixture of Gaussian distributions; and
the means for fusing the first probabilistic model and the second probabilistic model includes a processor and a non-transitory data storage on which is stored computer code which, when executed on the processor, causes the in-vehicle system to compute a product of the first probabilistic model and the second probabilistic model; and
wherein the computer code, when executed on the processor, causes the in-vehicle system to generate the first probabilistic model by:
detecting candidate raised pavement markers;
tracking the candidate raised pavement markers over time;
eliminating false positives among the candidate raised pavement markers;
fitting one or more splines to the candidate raised pavement markers;
segmenting the one or more splines; and
generating a mixture of probability distributions corresponding to respective segments of the one or more splines.

6. The in-vehicle system of claim 5, wherein the computer code, when executed on the processor, causes the in-vehicle system to generate the second probabilistic model by:
detecting candidate raised pavement markers;
tracking the candidate raised pavement markers over time;
eliminating false positives among the candidate raised pavement markers;
fitting one or more splines to the candidate raised pavement markers;
segmenting the one or more splines; and
generating a mixture of probability distributions corresponding to respective segments of the one or more splines.

7. The in-vehicle system of claim 5, further comprising a database containing statistical information regarding angular trajectories of painted lane markings or roadway boundaries, wherein
the computer code, when executed on the processor, causes the in-vehicle system to consult the database when generating the first and second probabilistic models.

8. The in-vehicle system of claim 5, wherein the computer code, when executed on the processor, causes the in-vehicle system to fuse the first and second probabilistic models through a multiplication operation.

9. The in-vehicle system of claim 5, wherein
the one or more detectors include a camera and a lidar detector; and
the computer code, when executed on the processor, causes the in-vehicle system to
detect candidate raised pavement markers;
determine a dynamic detection range for the lidar detector; and
identify candidate raised pavement markers falling outside the dynamic detection range as false positives.

10. The vehicle system of claim 5, wherein the dynamic detection range excludes areas where beams of the lidar detector are obstructed.

11. A computer-implemented method for estimating and tracking a lane boundary on a roadway, the method comprising:
    capturing image data along the roadway by an image capture device located on a vehicle;
    receiving the image data by at least one processor;
    obtaining lidar data along the roadway by a lidar device located on the vehicle;
    receiving lidar data by at least one processor;
    generating a first probabilistic model for the lane boundary based on the image data;
    generating a second probabilistic model for the lane boundary based on the lidar data;
    fusing the first probabilistic model and the second probabilistic model to generate a fused probabilistic model;
    estimating and tracking the lane boundary based on the fused probabilistic model;
    detecting candidate reflective and non-reflective raised pavement markers in the image data;
    tracking the candidate reflective and non-reflective raised pavement markers over time;
    eliminating false positives among the candidate reflective and non-reflective raised pavement markers;
    fitting one or more splines to the candidate reflective and non-reflective raised pavement markers;
    segmenting the one or more splines; and
    generating the first probabilistic model based on the segmented one or more splines;
    wherein the first probabilistic model includes a first mixture of Gaussian distributions;
    the second probabilistic model includes a second mixture of Gaussian distributions; and
    the means for fusing the first probabilistic model and the second probabilistic model includes a processor and a non-transitory data storage on which is stored computer code which, when executed on the processor, causes the in-vehicle system to compute a product of the first probabilistic model and the second probabilistic model.

12. The method of claim 11, wherein fusing the first probabilistic model and the second probabilistic model comprises multiplying the first probabilistic model and the second probabilistic model.

13. The method of claim 11, further comprising:
    detecting candidate reflective raised pavement markers in the lidar data;
    tracking the candidate reflective raised pavement markers over time;
    eliminating false positives among the reflective raised pavement markers;
    fitting one or more splines to the candidate reflective raised pavement markers;
    segmenting the one or more splines; and
    generating the second probabilistic model based on the segmented one or more splines.

14. The method of claim 11, further comprising querying a database containing statistical information regarding angular trajectories of painted lane markings or roadway boundaries.

15. The method of claim 11, further comprising:
    determine a dynamic detection range for the lidar detector; and
    identifying candidate raised pavement markers falling outside the dynamic detection range as false positives.

16. The method of claim 15, further comprising determining the dynamic detection range by excluding areas where beams of the lidar detector are obstructed.

* * * * *